United States Patent
Sandhaus et al.

(10) Patent No.: US 12,192,082 B1
(45) Date of Patent: Jan. 7, 2025

(54) TELEMETRY DATA ABSTRACTION

(71) Applicant: MELLANOX TECHNOLOGIES, LTD., Yokneam (IL)

(72) Inventors: Ran Sandhaus, Tel Aviv Jaffa (IL); Vladimir Shalikashvili, Petah-Tiqwa (IL); Ortal Bashan, Tel-Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/232,299

(22) Filed: Aug. 9, 2023

(51) Int. Cl.
*H04L 43/08* (2022.01)
*G06F 11/34* (2006.01)

(52) U.S. Cl.
CPC .......... *H04L 43/08* (2013.01); *G06F 11/3409* (2013.01)

(58) Field of Classification Search
CPC ......... H04L 43/08; H04L 41/16; H04L 41/06; G06F 11/3409; G06F 9/38; G06F 9/5038
USPC ....................................................... 709/224
See application file for complete search history.

(56) References Cited

U.S. PATENT DOCUMENTS

| | | | |
|---|---|---|---|
| 2021/0263744 A1* | 8/2021 | Crupnicoff | G06F 9/30036 |
| 2021/0318911 A1* | 10/2021 | Sastriawan | G06F 9/3867 |
| 2022/0114032 A1* | 4/2022 | Guim Bernat | H04L 67/1001 |
| 2023/0239196 A1* | 7/2023 | Lee | H04L 43/0847 |
| | | | 709/224 |
| 2023/0336447 A1* | 10/2023 | Kommula | H04L 41/0604 |

* cited by examiner

*Primary Examiner* — Glenford J Madamba
(74) *Attorney, Agent, or Firm* — Sheridan Ross P.C.

(57) ABSTRACT

Methods, systems, and computer program products to generate a telemetry pipeline. In embodiments, the system includes a communication interface that receives one or more user-defined functions for the telemetry pipeline. The system also includes control logic that implements programmatically the one or more user-defined functions to collect telemetry data at a plurality of layers in the telemetry pipeline based on the one or more user-defined functions and calculate smart metrics at different layers of the plurality of layers in the telemetry pipeline. The smart metrics may be calculated at a layer closest to where associated telemetry data is collected.

20 Claims, 4 Drawing Sheets

TELEMETRY DATA ABSTRACTION

FIELD OF TECHNOLOGY

The present disclosure relates to processing telemetry data in a network device. More specifically, the present disclosure relates to defining a flexible and programmable telemetry infrastructure.

BACKGROUND

Telemetry in networking provides the ability to monitor and retrieve information (e.g., status-based and/or event-based telemetry information) from a network, for example, from one or more connected devices (e.g., a switch, router, network interface card (NIC), etc.). Telemetry in networking may be used to determine the health of a network, including the health and/or performance of individual devices within the network. Telemetry allows users to pro-actively handle potential issues, debug issues, and even reprogram the network accordingly. As networks grow and data transmission rates rise, there is a challenge to provide accurate and constant telemetry data regarding networking resources (e.g., a network device) in use.

SUMMARY

Datacenter networks are becoming faster, bigger, and more complex, which makes them more error-prone. Therefore, there is a need for a more sophisticated, agnostic, and flexible telemetry infrastructure that provides more agile monitoring, alerting, and debugging capabilities. The described techniques relate to improved methods, systems, devices, and apparatuses that describe an infrastructure for defining a flexible and programmable telemetry infrastructure referred to herein as, "smart metrics." The present disclosure utilizes the concept of "abstract" telemetry, where functions (e.g., mathematical calculations, either pre-defined or programmable) are calculated over the standard telemetry data to create a higher-level interpretation of the data. In other words, taking a function over lower-level inputs (e.g., other metrics) to produce a more general or a higher abstraction metric.

A smart metric can be defined in different layers of the software stack (e.g., application, middleware, operating system user interface (OS UI), OS services, OS drivers and runtimes, firmware, and hardware) to exploit capabilities of each layer (e.g., more data availability in lower layers or building more complex functions in higher layers). Smart metrics may be built over basic metrics or other smart metrics in a hierarchical fashion.

A smart metric may be a mathematical function, ranging from sum or average, into more complex aggregations such as Fast Fourier Transform (FFT), and may be tied to specific lower-level metrics (e.g., network port counters). In order to make the smart metrics creation flexible and agile, the smart metrics will be implemented programmatically (e.g., user-defined functions). In embodiments, there may be a framework per layer throughout the stack, able to implement a specification created for smart metric implementations. In embodiments, a dedicated domain specific language (DSL) may be used to define the entire telemetry pipeline (or pipeline), and a dedicated compiler may generate the per-layer detailed specifications.

The purpose of this infrastructure is to create a telemetry pipeline in a flexible manner, while it exploits the creation of metrics efficiently (e.g., hierarchical structure) and accurately (in the correct abstraction layer, and not missing important data), which is relevant for networking devices, and, in general, datacenter telemetry; but the concept is generic and can be applied in other fields (e.g., Internet of Things (IoT) monitoring, automotive monitoring, etc.). By using DSL and the related toolchain, the telemetry infrastructure of the present disclosure is programmable. The present disclosure also allows high-level aggregation over lower-level telemetry data, and embeds telemetry collection and calculation in different levels of the pipeline, which avoids data loss and reduces telemetry bandwidth.

The present disclosure provides an infrastructure for computing user-defined functions over device hardware/software metrics (e.g., counters, metrics, states, events, etc.). The infrastructure spans across the entire stack: from the network management system (NMS)/telemetry collection system through software, the network operating system (NOS) and to the firmware layers. The infrastructure lets the user define functions in general terms: either scalar based (taking low-level metrics in some point of time and/or generating a new "high level smart metric"), or sequence based/time based (taking in account sequences of metrics and taking in account time domain to be able to produce stateful functions).

Lower-level layers (e.g., "below aggregation" layers) may be used to calculate atomic and accurate "smart metrics" in high resolution, which may later be aggregated in upper layers. For example, calculating a maximum bandwidth in lower resolution in the firmware layer instead of working in the higher layers (e.g., software user space or NMS), where because of averaging/sampling there is a loss of data and hence there is not a real "maximum."

Also, the infrastructure of the present disclosure allows for aggregation (e.g., over time) to reduce generated bandwidth. For example, by averaging telemetry data within a time window and transferring the calculated average (one value) rather than each individual data point, aggregation reduces the amount of data points over the time window. The infrastructure offers a dedicated DSL (domain specific language) for defining these function-based hierarchical telemetry pipelines. The DSL can be injected either in the NMS/collector layer (to create a full-stack tree from device to NMS/collector) or in the device level (to create a functional pipeline within a device software stack). In embodiments, such DSL may be P4 forking to create the network telemetry infrastructure.

One type of telemetry data is data based on counters that count various events, such as the number of packets received on a port, or the number of routing accesses performed. Another type of telemetry data is based on a status (e.g., gauge) of various resources (e.g., network devices, etc.), such as current buffer fill level (e.g., buffer size), queue length, current bandwidth (BW) transmitted on a given port, etc. Yet another type of telemetry data is event-driven data, where an indication is sent upon an event occurring, such as a buffer exceeding a threshold, latency exceeding a threshold, dropped packets exceeding a threshold, etc. As can be expected, depending on the size of a networked system, the volume of telemetry data reported can become large, which requires bandwidth to transmit and bandwidth to process. The present disclosure addresses these problems by reducing the amount of telemetry data required to monitor a network and/or individual network devices accurately and continuously.

In one example, a system comprising: an interface that receives one or more user-defined functions for the telemetry pipeline; and logic that: implements programmatically the one or more user-defined functions to: collect telemetry data at a plurality of layers in the telemetry pipeline based on the one or more user-defined functions; and calculate smart metrics at different layers of the plurality of layers in the telemetry pipeline, wherein the smart metrics are calculated at a layer closest to where associated telemetry data is collected.

In another example, a system comprising one or more processors to: receive one or more user-defined functions for the system; implement programmatically the one or more user-defined functions; collect telemetry data at a plurality of layers in the telemetry pipeline based on the one or more user-defined functions; calculate smart metrics at different layers in the plurality of layers in the telemetry pipeline, wherein the smart metrics are calculated at a layer closest to where associated telemetry data is collected; and aggregate the telemetry data and smart metrics across the plurality of layers in the telemetry pipeline.

In yet another example, a method of using a telemetry pipeline to abstract telemetry data, the method comprising: receiving one or more user-defined functions for a system; implementing programmatically the one or more user-defined functions; collecting telemetry data at a plurality of layers in the telemetry pipeline based on the one or more user-defined functions; calculating smart metrics at different layers in the plurality of layers in the telemetry pipeline, wherein calculating the smart metrics comprise taking a mathematical function of the telemetry data, and wherein the smart metrics are calculated at a layer closest to where respective telemetry data is collected, and; and aggregating the telemetry data and the smart metrics across the plurality of layers in the telemetry pipeline.

In some examples of the system, device, method, and machine-readable medium described herein, wherein calculating the smart metrics comprises taking a mathematical function of a collected metric.

In some examples of the system, device, method, and machine-readable medium described herein, wherein the collected metric comprises at least one of a counter, a state, and an event.

In some examples of the system, device, method, and machine-readable medium described herein, wherein the collected metric comprises a scalar metric (collected at a point in time).

In some examples of the system, device, method, and machine-readable medium described herein, wherein the collected metric comprises a sequence/time-based metric.

In some examples of the system, device, method, and machine-readable medium described herein, wherein the smart metrics are transferred between the plurality of layers in the telemetry pipeline.

In some examples of the system, device, method, and machine-readable medium described herein, wherein the telemetry pipeline spans across each layer of the system.

In some examples of the system, device, method, and machine-readable medium described herein, wherein the plurality of layers includes a hardware layer.

In some examples of the system, device, method, and machine-readable medium described herein, wherein the plurality of layers includes a firmware layer.

In some examples of the system, device, method, and machine-readable medium described herein, wherein the plurality of layers includes a software layer.

In some examples of the system, device, method, and machine-readable medium described herein, wherein the plurality of layers includes a user space layer.

In some examples of the system, device, method, and machine-readable medium described herein, wherein the plurality of layers includes a telemetry collector layer.

In some examples of the system, device, method, and machine-readable medium described herein, wherein the telemetry pipeline uses domain specific language (DSL).

In some examples of the system, device, method, and machine-readable medium described herein, wherein the control logic further: aggregates the telemetry data and the smart metrics across the plurality of layers in the telemetry pipeline.

In some examples of the system, device, method, and machine-readable medium described herein, wherein the plurality of layers includes: a hardware layer, a firmware layer, a software layer, a user space layer, and a telemetry collector layer.

Examples may include one of the following features, or any combination thereof.

DETAILED DESCRIPTION

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Example aspects of the present disclosure provide telemetry techniques which support, in addition to device performance analysis and flow statistics, security aspects (e.g., secure traffic), improved user experience, and latency reduction. In some cases, the techniques described herein may be applied to telecommunication (e.g., fourth generation (4G) telecommunication networks, fifth generation (5G) telecommunication networks, etc.) and Internet of Things (IoT) rich environments).

Aspects of a cloud infrastructure and/or local network infrastructure may be implemented by a programmable networking infrastructure, which includes telemetry. In some examples, the programmable networking infrastructure may be implemented through Software-Defined Networking (SDN) and Network Functions Virtualization (NFV) techniques. In some aspects, the programmable networking infrastructure may support software-based flow management (e.g., management of packets associated with different packet flows).

Aspects of the disclosure are further illustrated by and described with reference to apparatus diagrams, system diagrams, and flowcharts that relate to abstracting telemetry data.

Figure 1:
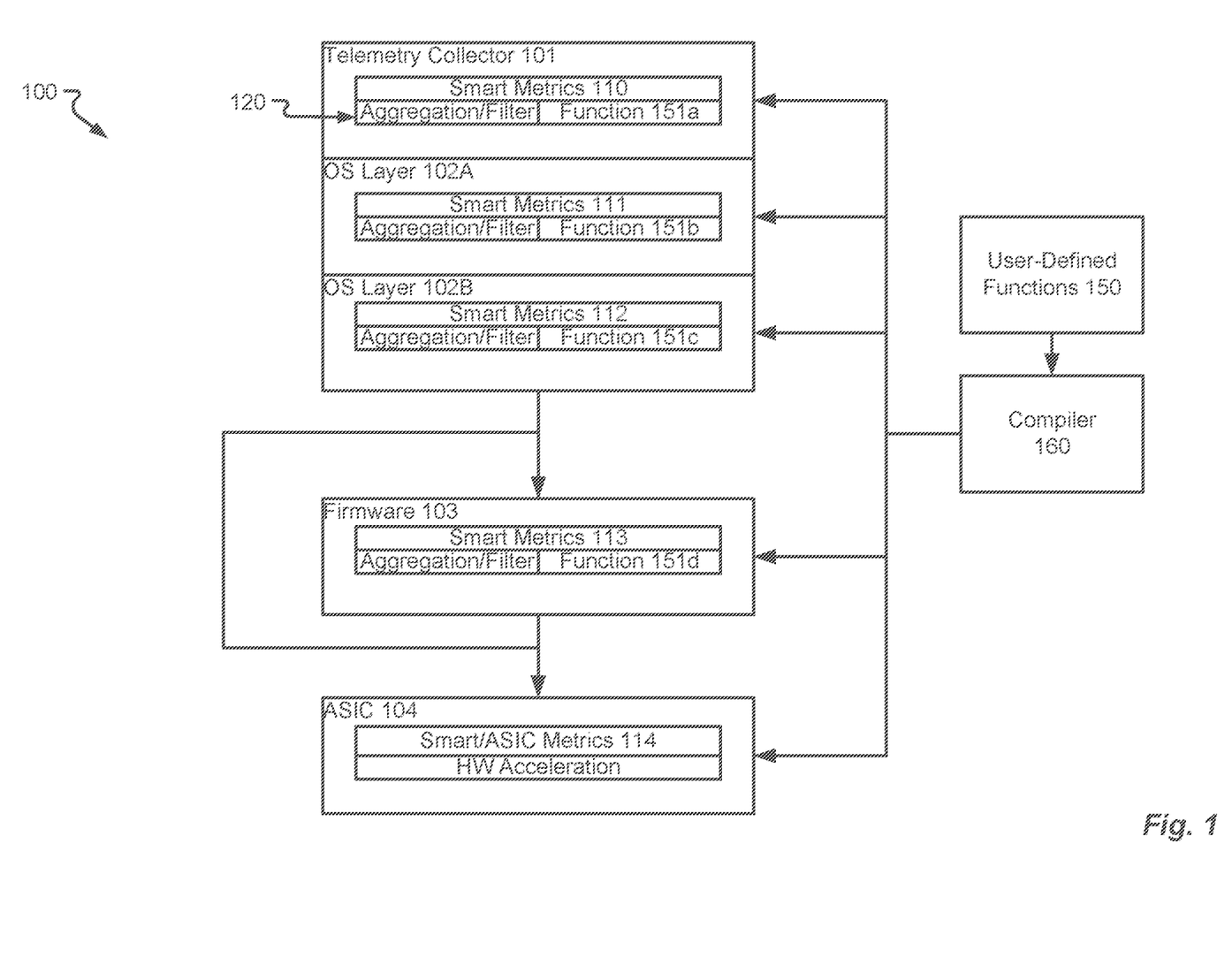
FIG. 1 illustrates an example of a telemetry infrastructure that supports abstracting telemetry data in accordance with aspects of the present disclosure.

FIG. 1 illustrates the general architecture for a smart metrics infrastructure in accordance with aspects of the present disclosure. A smart metric may be defined in each layer of the operating system (OS) (e.g., OS layers 102A-B, firmware 103, and application-specific integrated circuit (ASIC) 104), may be stateless/stateful, and may utilize filtering (e.g., sampling) and aggregation (to perform reduction). A toolchain, accommodating a compiler 160, is provided to translate an overall specification (e.g., user-defined functions 150) to local specifications for the different stack layers.

In an example, a device 100 may include a telemetry collector 101, OS layers 102A-B, firmware 103, and ASIC 104. The network device 100 may comprise servers, endpoints, switches, routers, network interface cards (NIC), central processing units (CPUs), graphics processing units (GPUs), data processing units (DPUs), etc.

The telemetry collector 101 may support monitoring of the device 100 and collection of telemetry data in association with monitoring security, application health, quality, and performance of the local networking infrastructure (not shown). In some cases, the telemetry collector 101 may support monitoring of network infrastructure, storage infrastructure, and overall bandwidth capacity and consumption. In some aspects, the telemetry collector 101 may support cloud monitoring (e.g., with respect to metrics such as cloud availability, Internet latency, outages, etc.) and routing decisions (e.g., with respect to routing data over and between any of the local networking infrastructure and the devices, etc.).

In embodiments, the telemetry collector 101, OS layers 102A-B, firmware 103, and ASIC 104 receive and implement user-defined functions 150 translated by compiler 160. In embodiments, user-defined functions may include mathematical functions (e.g., a sum, average, FFT, etc.) of telemetry data (e.g., counters, metrics, states, events, etc.). The infrastructure lets a user define functions in general terms: either scalar based (in some point of time) or sequence based/time based.

This infrastructure is able to generate a computed telemetry pipeline in accordance with the present disclosure. In embodiments, some smart metrics are generated in the device 100, exploiting the ASIC 104 resources to get an accurate view. Some of these metrics may be useful on their own within the system. By creating a more high-level smart metric from different devices' data, a fabric-wide view is generated in the telemetry collection system. In embodiments, specific signals are generated in firmware (e.g., "below aggregation") to monitor microbursts (e.g., taking max( ) of some counters), then aggregating these up to the telemetry collector 101. In another example, debug and other customer-specific signals that are not readily available on the stack may be generated. In yet another example, abstract metrics, such as a moving average or FFT over a lower-level signal, are generated to produce an analysis over the telemetry infrastructure.

In an example, the device 100 may include various layers (included layers not shown). Each layer may include smart metrics 110-114, aggregation/filter 120, and a function 151a-d. In embodiments, the function 151a-d stores the instructions from the compiler 160 to collect/abstract telemetry data (e.g., smart metrics 110-114). The aggregation/filter 120 in each layer may aggregate the telemetry data/smart metrics before the data is transferred to a higher layer. The telemetry collector 101 may support collection of telemetry data in association with monitoring security, application health, quality, and performance of the device 100.

The smart metrics 110-114 allow abstraction of the telemetry data, where different metrics are taken in each layer (e.g., manipulation of the data occurs in the same layer the data is collected). By applying abstraction techniques, the present disclosure can reduce data loss and also reduce the bandwidth used to transfer telemetry data. The smart metrics may be aggregated and filtered before being transferred to a higher layer. For example, smart metrics 113 calculated in the firmware layer 103 is aggregated/filtered before being transferred to the telemetry collector 101. Similarly, smart metrics 111 calculated in the OS layer 102A is aggregated/filtered before being transferred to the telemetry collector 101.

Abstracted telemetry data (e.g., smart metrics) may be transmitted to another device for reporting. In embodiments, the smart metrics are used to determine a status for an associated network device and/or local networking infrastructure. In addition to monitoring, the telemetry collector 101 may be able to send instructions to the network and/or network devices regarding reconfiguring the network and/or network devices. For example, the telemetry collector 101 may instruct an overloaded network device to offload tasks to another network device.

Figure 2:
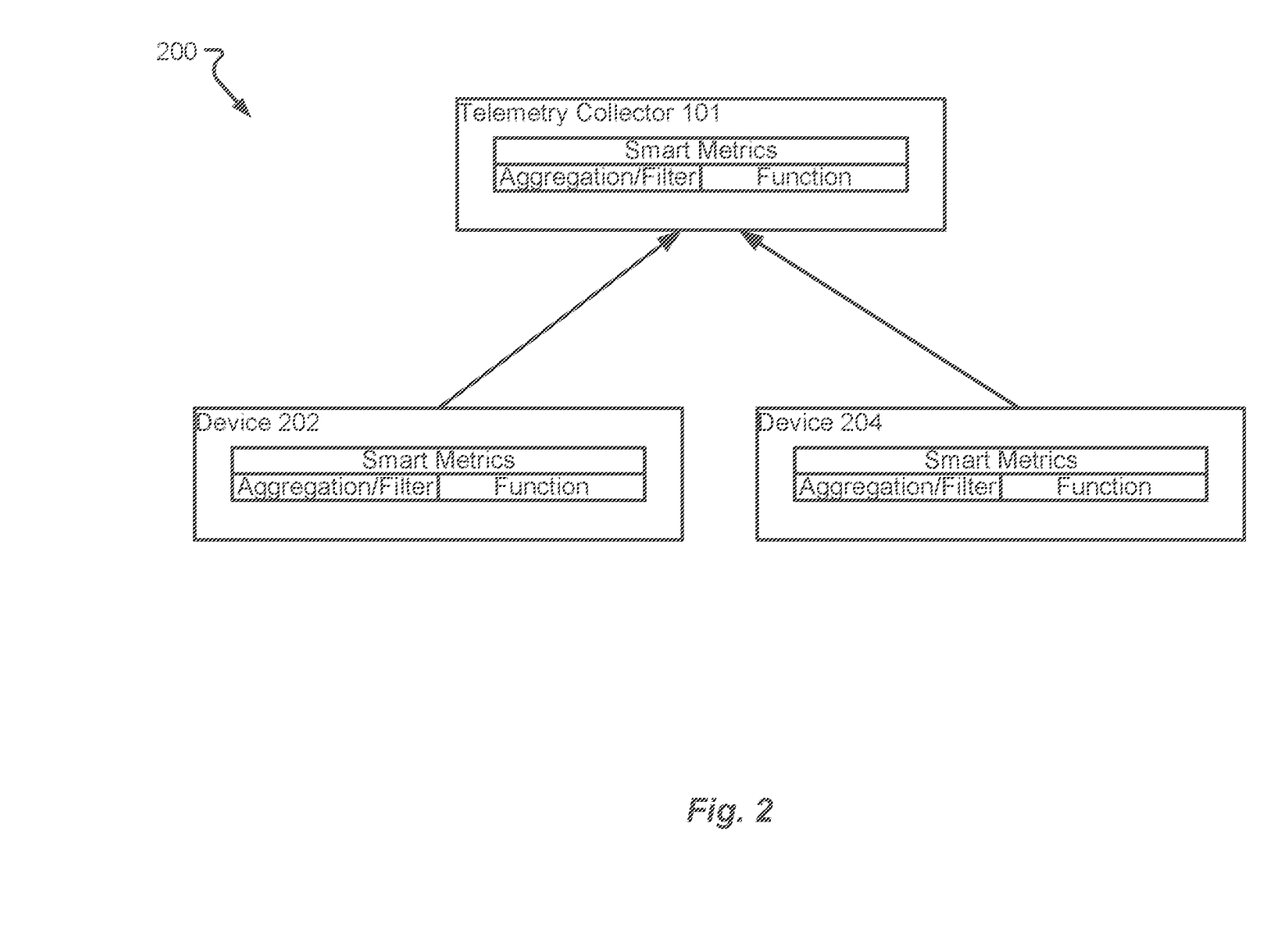
FIG. 2 illustrates another example of a telemetry infrastructure that supports abstracting telemetry data in accordance with aspects of the present disclosure.

FIG. 2 depicts system 200 that implements the telemetry pipeline over a full-stack tree from devices 202 and 204 to the telemetry collector 101. In embodiments, each device 202, 204 includes a telemetry pipeline as illustrated in FIG. 1.

Figure 3:
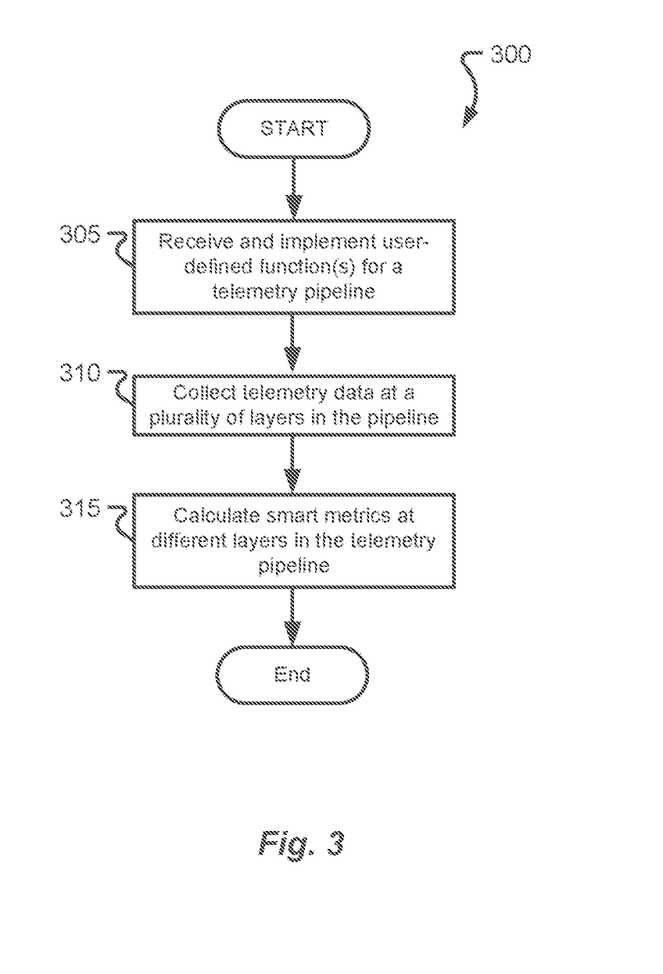
FIG. 3 illustrates a process flow for abstracting telemetry data in accordance with aspects of the present disclosure.

FIG. 3 illustrates an example of a process flow 300 that supports abstraction of telemetry data in accordance with aspects of the present disclosure. In some examples, process flow 300 may implement aspects of device 101 described with reference to FIGS. 1-2 and 4.

In the following description of the process flow 300, the operations may be performed in a different order than the order shown, or the operations may be performed in different orders or at different times. Certain operations may also be left out of the process flow 300, or other operations may be added to the process flow 300.

In step 305, user-defined function(s) are received and implemented for a telemetry pipeline. For example, devices 100 receives the user-defined functions 150 via the compiler 160. In embodiments, the user-defined functions may include mathematical functions (e.g., sum, average, FFT, etc.). For example, the user-defined functions for each layer may be stored in memory (e.g., functions 151a-d).

In step 310, telemetry data is collected in different layers (e.g., layers 102A-104) of the pipeline.

In step 315, smart metrics are calculated at different layers in the telemetry pipeline. To avoid data loss and bandwidth usage, the smart metrics may be calculated at the layer in which the low-level metrics are collected. In other words, rather than transferring the low-level metrics to the telemetry collector 101, smart metrics (which may also be aggregated and/or filtered) are transferred to the telemetry collector 101. In embodiments, the user-defined functions received in step 305 are used on low-level metrics (e.g., counters, metrics, states, events, etc.) to calculate smart metrics.

The calculated smart metrics may be used to determine performance of the device 100, 202, and 204 or the network (the whole network or a portion of the network). In embodiments, smart metrics are calculated and compared to predetermined values. If the smart metrics exceed the predetermined value, an alert may be triggered. The alert may be sent to a network administrator to correct the issue. The alert may be automatically sent (e.g., with no user intervention) to the associated device with instructions for correction.

Additionally, although not illustrated, the smart metrics may be sent to a central telemetry monitor. In embodiments, the operations of the central telemetry monitor may be incorporated into the telemetry collector 101. In embodiments, the smart metrics may be used to train machine-learning models to monitor the performance of a network and/or network devices within the network.

Figure 4:
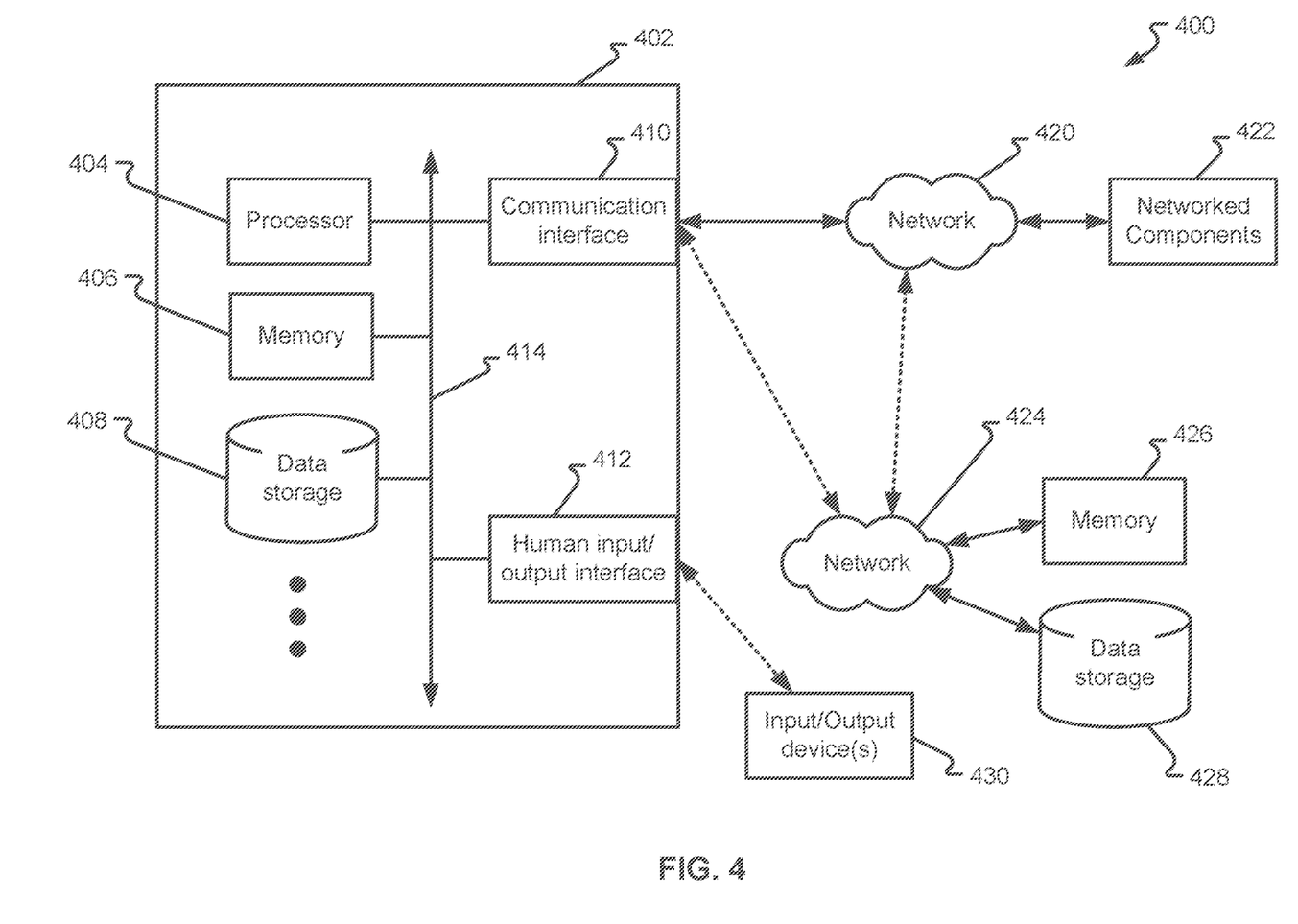
FIG. 4 illustrates an example system for modulating telemetry data in accordance with aspects of the present disclosure.

FIG. 4 depicts device 402 in system 400 in accordance with embodiments of the present disclosure. Device 402 may be an example of the telemetry collector 101 and/or the telemetry monitor.

The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414.

In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally, or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or utilize one or more networks, such as network 420 and/or network 424. Input/output device(s) 430 may be accessed by processor 404 via human input/output interface 412 and/or via communication interface 410 either directly, via network 424 (not shown), via network 420 alone (not shown), or via networks 424 and 420 (not shown).

Networks 420 and 424 may be a wired network (e.g., Ethernet), wireless (e.g., Wi-Fi, Bluetooth, cellular, etc.) network, or combination thereof and enable device 402 to communicate with networked component(s) 422 (e.g., automation system). In other embodiments, networks 420 and/or 424 may be embodied, in whole or in part, as a telephony network (e.g., public switched telephone network (PSTN), private branch exchange (PBX), cellular telephony network, etc.).

Components attached to network 424 may include memory 426 and data storage 428. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Each of memory 406 and data storage 408, memory 426, data storage 428 comprise a non-transitory data storage comprising a data storage device.

Any of the steps, functions, and operations discussed herein can be performed continuously and automatically.

The exemplary apparatuses, systems, and methods of this disclosure have been described in relation to examples of a telemetry collector 101. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system to generate a telemetry pipeline, the system comprising:
   an interface that receives one or more user-defined functions for the telemetry pipeline; and
   a processor including logic that:
      implements programmatically the one or more user-defined functions to:
         collect telemetry data at a plurality of Operating System (OS) layers in the telemetry pipeline based on the one or more user-defined functions; and
         calculate smart metrics at different layers of the plurality of OS layers in the telemetry pipeline, wherein the smart metrics are built in a hierarchal manner with increasing complexity from a lower layer to an upper layer, wherein the smart metrics are calculated at a layer closest to where associated telemetry data is collected, and wherein the smart metrics aggregate the collected telemetry data.

2. The system of claim 1, wherein calculating the smart metrics comprises taking a mathematical function of a collected metric.

3. The system of claim 2, wherein the collected metric comprises at least one of a counter, a state, and an event.

4. The system of claim 2, wherein the collected metric comprises a scalar metric (collected at a point in time).

5. The system of claim 2, wherein the collected metric comprises a sequence/time-based metric.

6. The system of claim 1, wherein the smart metrics are transferred between the plurality of OS layers in the telemetry pipeline.

7. The system of claim 1, wherein the telemetry pipeline spans across each OS layer of the system.

8. The system of claim 1, wherein the plurality of OS layers includes a hardware layer.

9. The system of claim 1, wherein the plurality of OS layers includes a firmware layer.

10. The system of claim 1, wherein the plurality of OS layers includes a software layer.

11. The system of claim 1, wherein the plurality of OS layers includes a user space layer.

12. The system of claim 1, wherein the plurality of OS layers includes a telemetry collector layer.

13. The system of claim 1, wherein the telemetry pipeline uses domain specific language (DSL).

14. The system of claim 1, wherein the logic further:
    aggregates the telemetry data and the smart metrics across the plurality of OS layers in the telemetry pipeline.

15. A system comprising:
    an interface that receives one or more user-defined functions for the system; and one or more processors to:
    implement programmatically the one or more user-defined functions;
    collect telemetry data at a plurality of Operating System (OS) layers in a telemetry pipeline based on the one or more user-defined functions;

calculate smart metrics at different layers in the plurality of OS layers in the telemetry pipeline, wherein the smart metrics are built in a hierarchal manner with increasing complexity from a lower layer to an upper layer, and wherein the smart metrics are calculated at a layer closest to where associated telemetry data is collected; and aggregate the telemetry data and the smart metrics across the plurality of OS layers in the telemetry pipeline.

16. The system of claim 15, wherein calculating the smart metrics comprise taking a mathematical function of a collected metric, and wherein the collected metric comprises at least one of a counter, a state, and an event.

17. The system of claim 16, wherein the collected metric comprises a scalar metric (collected at a point in time) or a sequence/time-based metric.

18. The system of claim 15, wherein the plurality of OS layers includes: a hardware layer, a firmware layer, a software layer, a user space layer, and a telemetry collector layer.

19. The system of claim 15, wherein the telemetry pipeline uses domain specific language (DSL).

20. A method of using a telemetry pipeline to abstract telemetry data, the method comprising:

receiving one or more user-defined functions for a system;

implementing programmatically the one or more user-defined functions;

collecting telemetry data at a plurality of Operating System (OS) layers in the telemetry pipeline based on the one or more user-defined functions;

calculating smart metrics at different layers in the plurality of OS layers in the telemetry pipeline, wherein calculating the smart metrics comprises taking a mathematical function of the telemetry data, wherein the smart metrics are built in a hierarchal manner with increasing complexity from a lower layer to an upper layer, and wherein the smart metrics are calculated at a layer closest to where respective telemetry data is collected; and aggregating the telemetry data and the smart metrics across the plurality of OS layers in the telemetry pipeline.

* * * * *